United States Patent
Lim et al.

(10) Patent No.: US 7,251,962 B2
(45) Date of Patent: Aug. 7, 2007

(54) WASHING MACHINE WITH STRUCTURE FOR ABSORBING VIBRATION OF DRIVING PART

(75) Inventors: Hee Tae Lim, Puchon-shi (KR); Seung Chul Park, Kwangmyong-shi (KR); Dong Won Kim, Kwangmyong-shi (KR); Bo Young Chang, Seoul (KR)

(73) Assignee: LG Electronics Inc., Seoul (KR)

( * ) Notice: Subject to any disclaimer, the term of this patent is extended or adjusted under 35 U.S.C. 154(b) by 362 days.

(21) Appl. No.: 10/267,648

(22) Filed: Oct. 10, 2002

(65) Prior Publication Data

US 2003/0213271 A1 Nov. 20, 2003

(30) Foreign Application Priority Data

May 14, 2002 (KR) .......................... 10-2002-26458

(51) Int. Cl.
*D06F 37/30* (2006.01)
*H02K 5/24* (2006.01)
*F16C 3/00* (2006.01)

(52) U.S. Cl. .......................... 68/23.3; 68/23.7; 68/140; 310/51; 464/180

(58) Field of Classification Search ................. 68/23.1, 68/23.3, 23.7, 140; 310/51; 464/180
See application file for complete search history.

(56) References Cited

U.S. PATENT DOCUMENTS 3,686,895 A * 8/1972 Easley .......................... 464/180
4,425,813 A * 1/1984 Wadensten ..................... 74/87
4,432,528 A 2/1984 Kretchman et al.
4,471,248 A * 9/1984 Smetana ....................... 310/51
5,778,703 A * 7/1998 Imai et al. .................. 68/12.02
5,934,107 A 8/1999 Lee et al.
6,049,930 A * 4/2000 Hisano et al. ................. 8/159
6,332,343 B1 * 12/2001 Koketsu et al. ............. 68/23.7
6,460,382 B1 * 10/2002 Kim et al. .................... 68/140

FOREIGN PATENT DOCUMENTS

| GB | 2 001 107 A | | 1/1979 |
|---|---|---|---|
| JP | 02-46891 | | 2/1990 |
| JP | 02305597 A | * | 12/1990 |
| JP | 03-97495 | | 4/1991 |
| JP | 05-115673 | | 5/1993 |

* cited by examiner

*Primary Examiner*—Joseph L. Perrin
(74) *Attorney, Agent, or Firm*—Birch, Stewart, Kolasch & Birch, LLP

(57) ABSTRACT

A washing machine with a vibration-absorbing structure for preventing the transfer of the vibration of the driving part is disclosed. The washing machine includes a rotor housing 50 in which a rotor is installed and which is rotatably moved, a driving shaft 20, 31, 33 for rotating a washing tub or a pulsator using a rotational force transferred from the rotor housing, a power transferring member 120 for transferring the rotational force of the rotor housing to the driving shaft, a rotor bushing 110 coupled to the rotor housing and through which the driving shaft penetrates to be slidingly moved, and at least one vibration-absorbing member 140, 150 installed on a path where a power is transferred from the rotor housing to the driving shaft, for absorbing vibration of the rotor housing.

20 Claims, 5 Drawing Sheets

WASHING MACHINE WITH STRUCTURE FOR ABSORBING VIBRATION OF DRIVING PART

This application claims the benefit of the Korean Application No. P2002-26458 filed on May 14, 2002, which is hereby incorporated by reference.

BACKGROUND OF THE INVENTION

1. Field of the Invention

The present invention relates to a washing machine, and more particularly, to a washing machine with a vibration-preventing structure for preventing the transfer of the vibration of the driving part to other part, thereby minimizing occurrence of vibration and noise.

2. Discussion of the Related Art

Generally, washing machine is an apparatus for washing laundry using frictional action of wash water, emulsification action of detergent and so forth. The wash procedure of the washing machine generally includes cycles of wash, rinse and dehydration.

In these washing machines, an outer tub containing wash water is fixedly installed inside a cabinet appearance of a washing machine, a washing tub for receiving the laundry is rotatably installed inside the outer tub, and a driving part for rotating the washing tub is installed below the outer tub.

Hereinafter, the structure of the driving part is described with reference to FIGS. 1 and 2.

FIG. 1 is a sectional view of a driving part of a conventional washing machine, and FIG. 2 is a sectional vie taken along the line I-I of FIG. 1.

As shown in FIG. 1, a tub base 2 for supporting an outer tub 1 is installed at the lower portion of the outer tub 1, and a bearing housing 10 is installed at the lower portion of the tub base 2.

A stator 3 is installed at the lower portion of the bearing housing 10, and a rotor 5 is rotatably installed outside the stator 3. The rotor 5 is fixed to a rotor housing 50. The rotor 5 is maintained spaced apart from the stator 3 at a constant interval, e.g., approximately 0.5 mm. In other words, the driving part shown in FIG. 1 is an outer rotor type induction motor.

A hollow washing tub shaft 20 is rotatably installed inside the bearing housing 10. Inside the washing tub shaft 20 is installed a decelerator 40. An upper pulsator shaft 33 is connected to an upper portion of the decelerator 40 and a lower pulsator shaft 31 is connected to a lower portion of the decelerator 40. At this time, the upper end of the washing tub shaft 20 is coupled to the washing tub (not shown), and the upper end of the upper pulsator shaft 33 is coupled to the pulsator (not shown).

A rotor bushing 60 is coupled to the core of the rotor housing 50, and the lower end of the lower pulsator shaft 31 penetrates the rotor bushing 60 and is coupled thereto. The rotor bushing 60 is fixed to the rotor housing 50 by a plurality of coupling bolts 65.

In order to transfer the rotational force of the lower pulsator shaft 31 to the washing tub shaft 20, a coupling 70 is installed at the outer circumference of the washing tub shaft 20 and the outer circumference of the rotor bushing 60. According to the location of the coupling 70, the washing tub shaft 20 is selectively coupled to the rotor bushing 60, and during their coupling, the rotational force of the lower pulsator shaft 31 is transferred to the washing tub shaft 20.

As shown in FIG. 2, a coupling part 61 having a polygonal section is formed at the inner circumference of the rotor bushing 60. The coupling part 61 is coupled to the outer circumference of the lower pulsator shaft 31 to transfer the rotational force of the rotor housing 50 to the lower pulsator shaft 31. Also, a serration part 63 is formed at the outer circumference of the rotor bushing 60. Through the serration part 63, the coupling 70 ascends and descends, and the lower pulsator shaft 31 and the washing tub shaft 20 are coupled or separated depending on the location of the coupling 70.

Meanwhile, as shown in FIG. 1, between the bearing housing 10 and the washing tub shaft 20, and between the washing tub shaft 20 and the pulsator shaft 31, 33 are installed a plurality of bearings 11, 13.

However, the driving part of the conventional washing machine may cause the following problems. In other words, since the rotor 5 is a rotational body, it always generates some vibration. Then, since the rotor housing 50 is directly coupled to the pulsator shaft 31, 33 or the washing tub shaft 20 through the rotor bushing 60, the vibration of the rotor 5 is transferred without any filtering. In this case, the vibration of the rotor 5 is transferred to the washing tub or the outer tub 1, so that a considerable noise is caused.

In particular, the rotor 5 does not rotate at a constant revolution per minute (RPM) but is driven while varying the RPM within a certain range. Owing to the variation of the RPM, there occurs a ripple phenomenon in which the pulsator shaft 31,33 or the washing tub shaft 20 vibrates. For instance, if the rotor 5 is set to rotate at an 850 rpm, it rotates in real in a range of 840-860 rpm. At this time, the ripple phenomenon is one vibration source, which is directly transferred to the washing tub or the outer tub 1 to cause a regular noise during its operation.

SUMMARY OF THE INVENTION

Accordingly, the present invention is directed to a washing machine with a structure for absorbing vibration of a driving part that substantially obviates one or more problems due to limitations and disadvantages of the related art.

An object of the present invention is to provide a washing machine with a vibration-preventive structure for preventing the transfer of the vibration of the driving part to other part, thereby minimizing occurrence of vibration and noise.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a washing machine includes: a rotor housing in which a rotor is installed and which is rotatably moved; a driving shaft for rotating a washing tub or a pulsator using a rotational force transferred from the rotor housing; a power transferring member for transferring the rotational force of the rotor housing to the driving shaft; a rotor bushing coupled to the rotor housing and through which the driving shaft penetrates to be slidingly moved; and at least one vibration-absorbing member installed on a path where a power is transferred from the rotor housing to the driving shaft, for absorbing vibration of the rotor housing.

In an aspect, the power transferring member is a bracket which is coupled to the rotor housing and at the same time which the driving shaft penetrates to be coupled to.

At this time, the vibration-absorbing member is installed between the rotor housing and the bracket. The vibration-absorbing member is fixed by a coupling member for fixing the rotor bushing and the bracket to the rotor housing.

In an aspect, the washing machine of the present invention further includes a power breaking member coupled to the driving shaft, for selectively transferring the rotational force of the rotational shaft to the washing tub.

At this time, the vibration-absorbing member is installed between the rotor bushing and the power breaking member.

Thus, according to the present invention, the driving shaft is not directly coupled to the rotor bushing like the conventional art but only penetrates the rotor bushing to be coupled to the rotor housing through the bracket. At this time, since the vibration-absorbing member is installed between the bracket and the rotor housing, the vibration of the rotor is absorbed by the vibration-absorbing member before it is transferred to the driving shaft. Accordingly, it is prevented that the washing tub or outer tub vibrates through the driving shaft, thereby preventing occurrence of noise.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
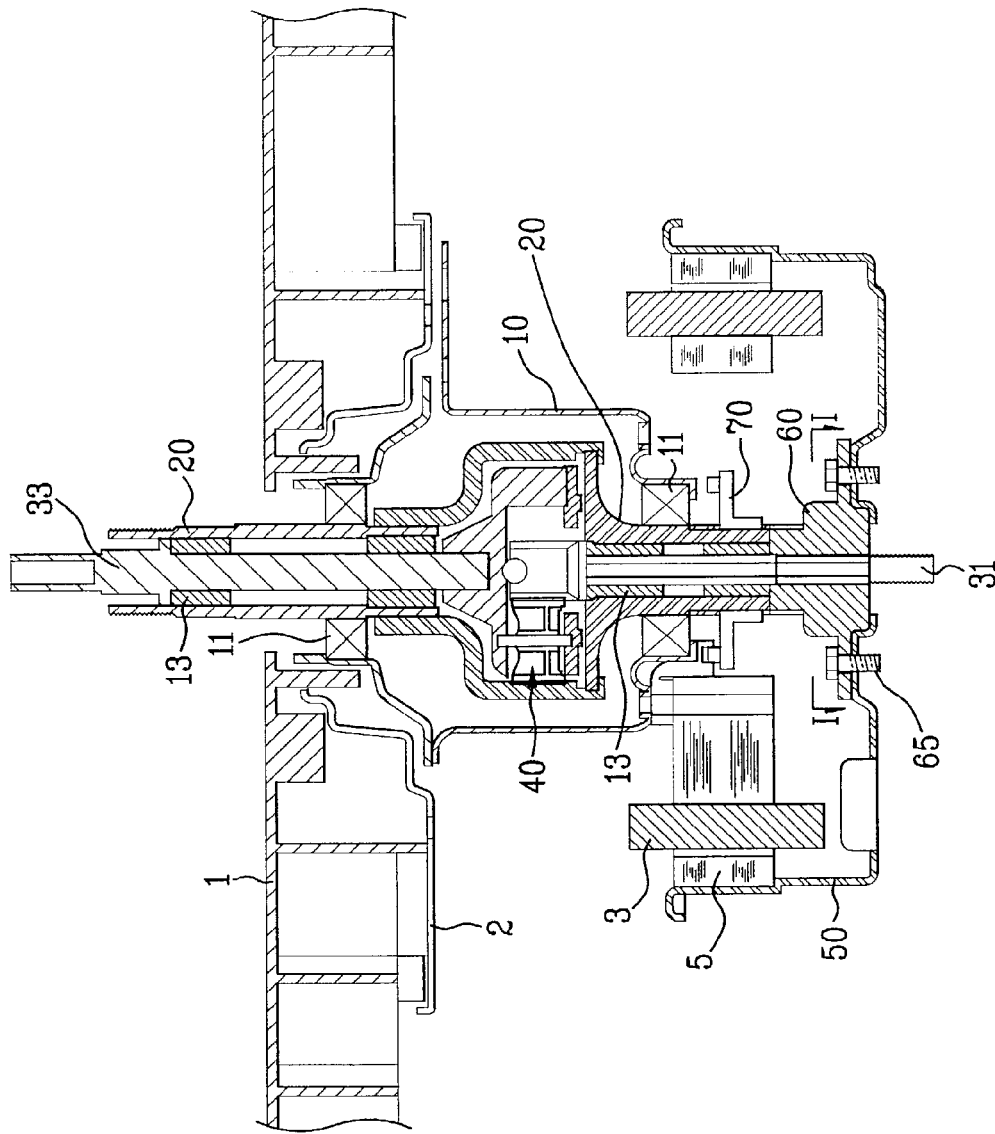
FIG. 1 is a sectional view of a driving part of a conventional washing machine.
Figure 2:
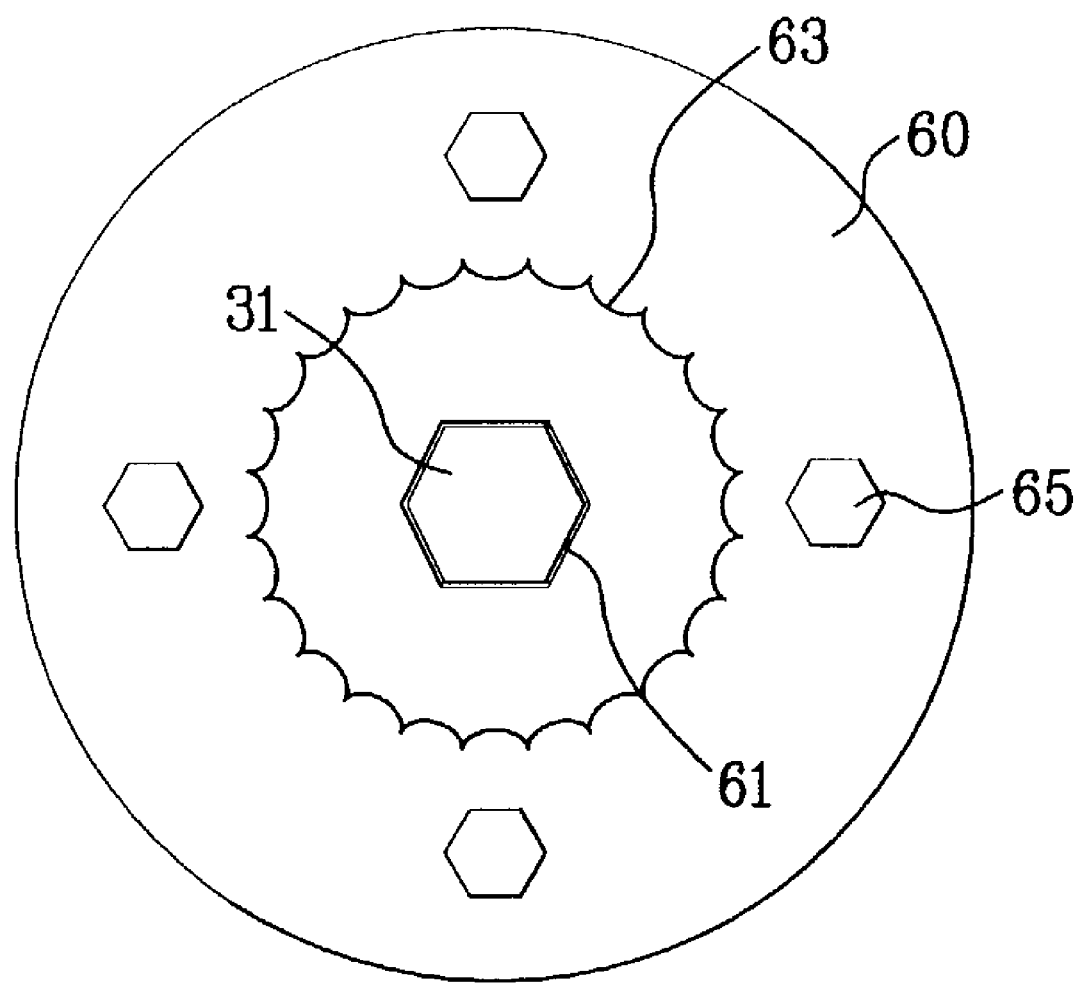
FIG. 2 is a sectional vie taken along the line I-I of FIG. 1.
Figure 3:
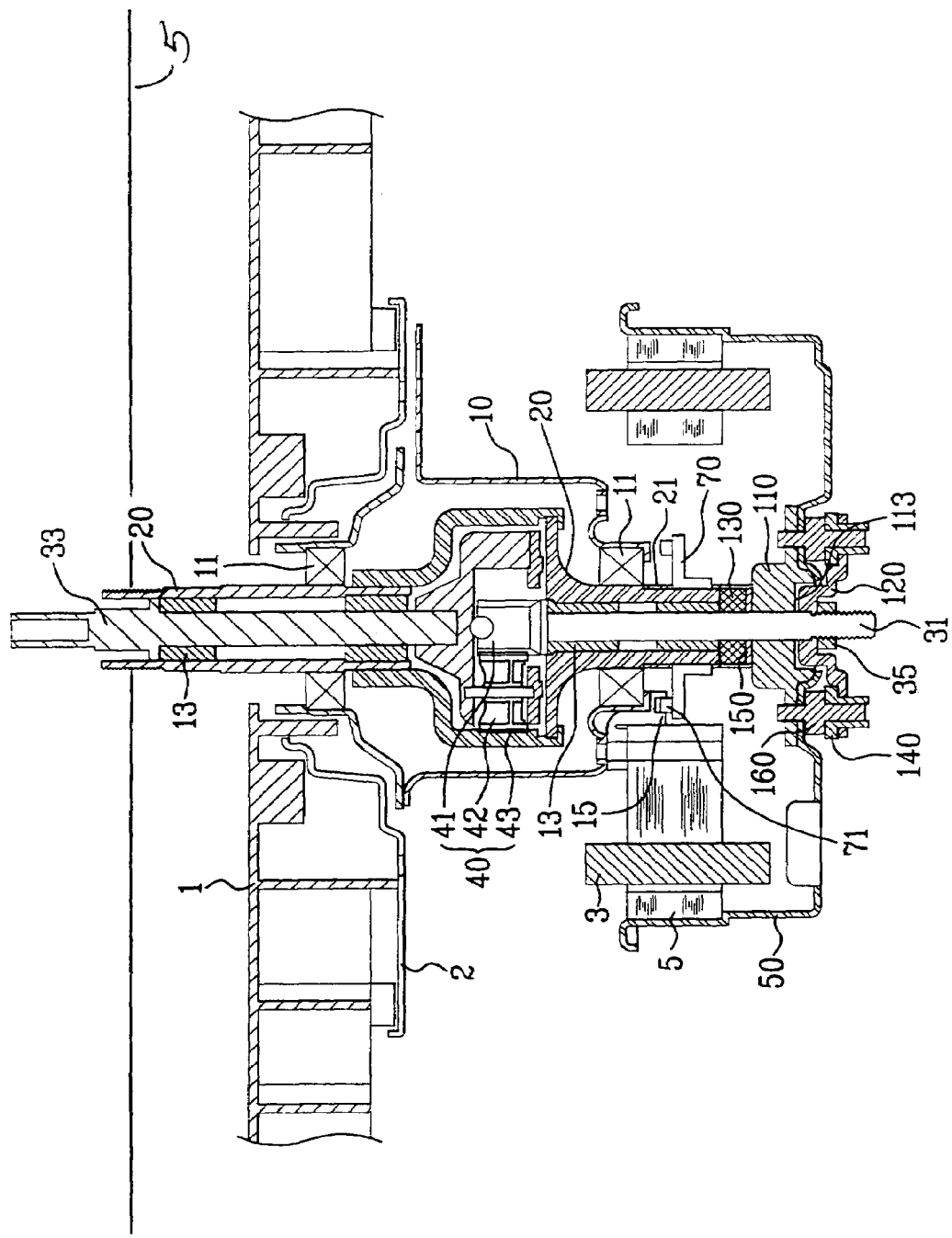
FIG. 3 is a sectional view of a driving part of a washing machine according to a preferred embodiment of the present invention, and shows a state of wash cycle.
Figure 4:
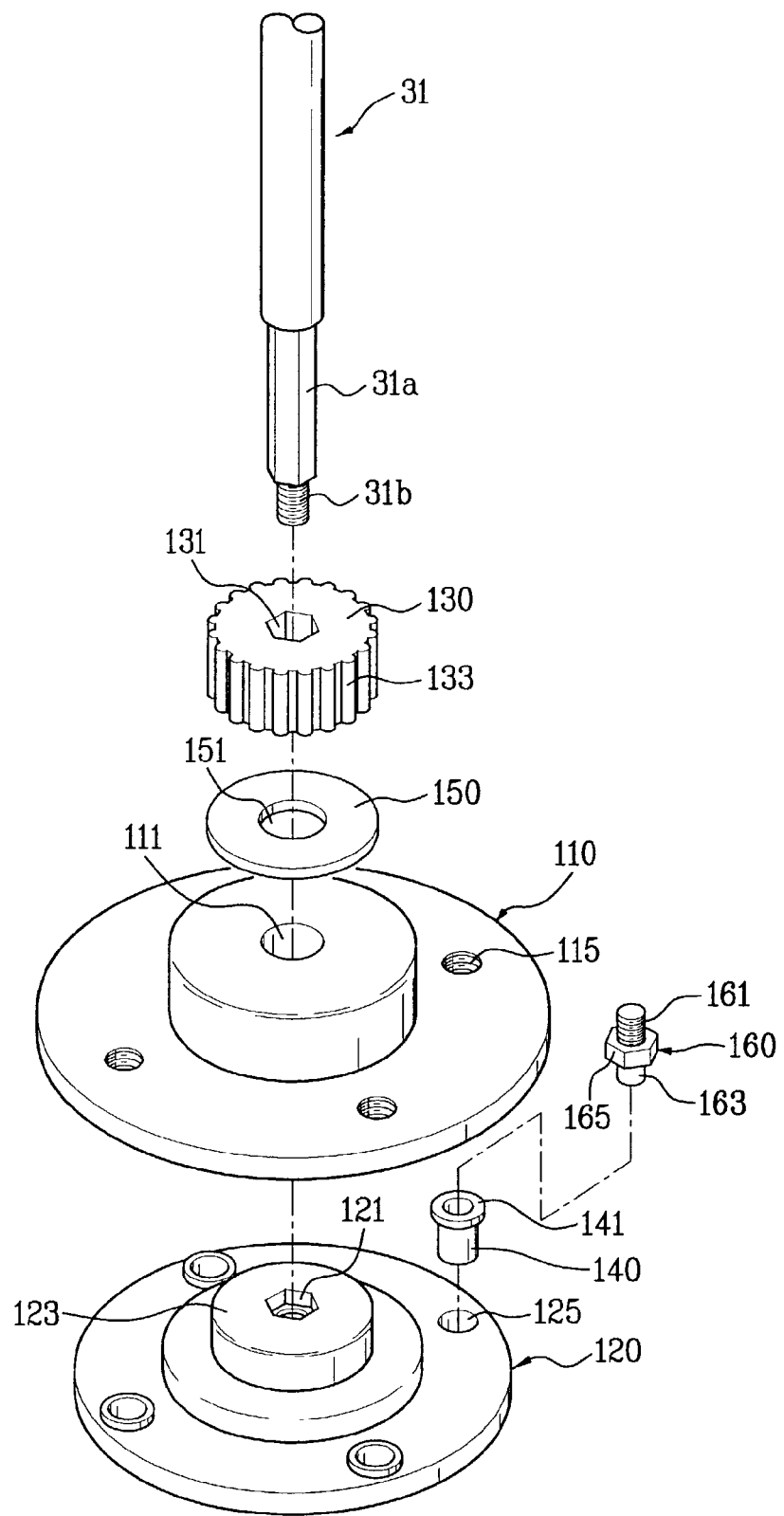
FIG. 4 is a disassembled perspective view of main elements of the driving part of FIG. 3.
Figure 5:
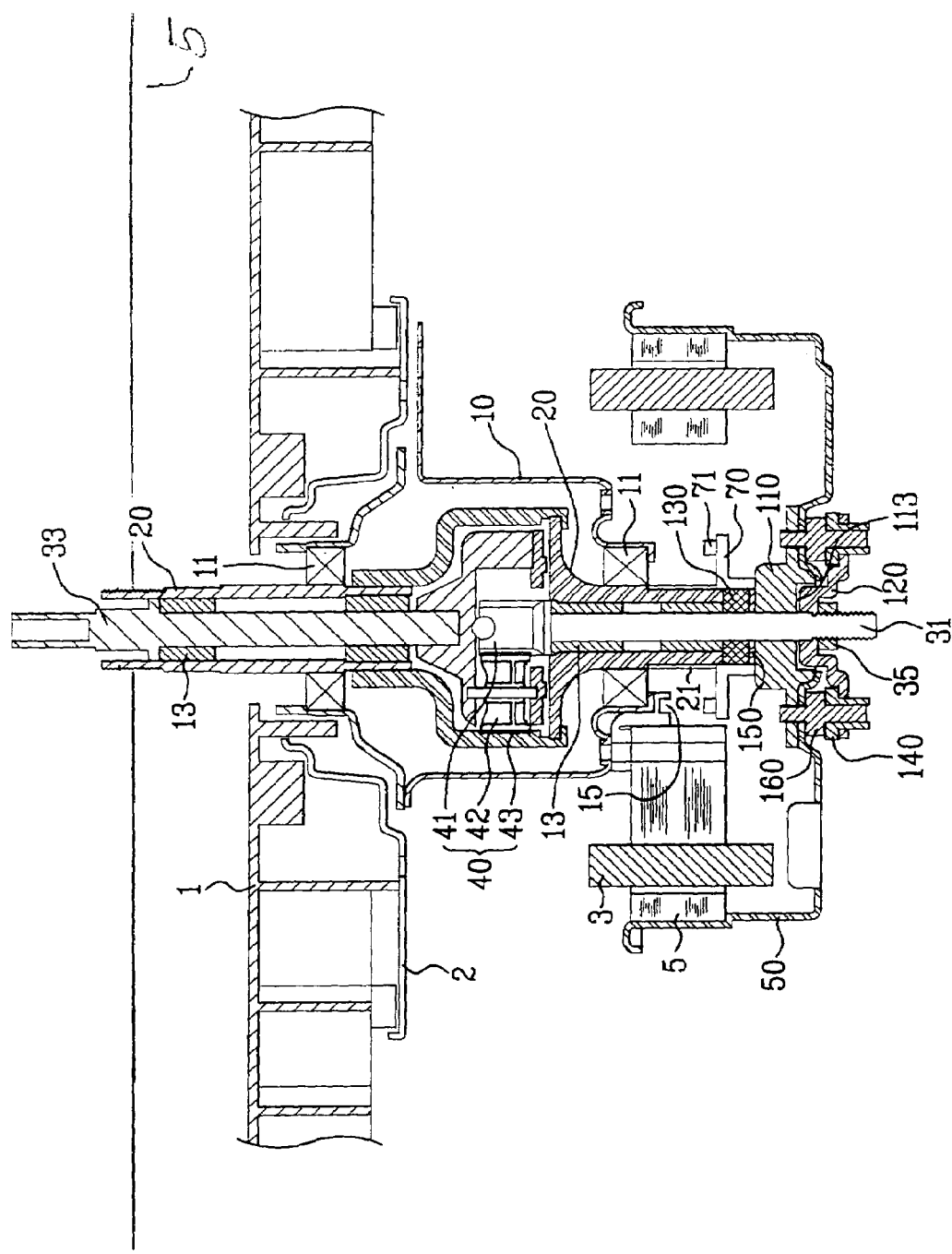
FIG. 5 illustrates is a sectional view of a driving part of a washing machine according to a preferred embodiment of the present invention, and shows a state of dehydration cycle.

FIG. 3 is a sectional view of a driving part of a washing machine according to a preferred embodiment of the present invention, and shows a state of wash cycle, FIG. 4 is a disassembled perspective view of main elements of the driving part of FIG. 3, and FIG. 5 illustrates is a sectional view of a driving part of a washing machine according to a preferred embodiment of the present invention, and shows a state of dehydration cycle.

First, as shown in FIG. 3, a tub base 2 for supporting an outer tub 1 is installed at the lower portion of the outer tub 1, and a bearing housing 10 is installed at the lower portion of the tub base 2.

A stator 3 is installed at the lower portion of the bearing housing 10, and a rotor 5 is rotatably installed outside the stator 3. The rotor 5 is fixed to a rotor housing 50. Accordingly, the rotor housing 50 is rotatable along with the rotor 5. The rotor 5 is maintained spaced apart from the stator 3 at a constant interval, e.g., approximately 0.5 mm.

A driving shaft penetrates the interior of the bearing housing 10. The driving shaft includes a hollow washing tub shaft 20 and a pulsator shaft 31, 33 rotatably installed inside the washing tub shaft 20. At this time, two, upper and lower bearings 11 are installed between the bearing housing 10 and the hydration shaft 20, and a plurality of bearings are also installed between the washing tub shaft 20 and the pulsator shaft 31, 33. A washing tub 5 is coupled to the upper end of the washing tub shaft 20, and a pulsator is coupled to the upper end of the pulsator shaft 33.

Inside the washing tub shaft 20 is installed a decelerator having a proper deceleration ratio. At this time, the pulsator shaft is divided into the upper pulsator shaft 33 and the lower pulsator shaft 31 round the decelerator 40. The decelerator 40 includes a line gear 41, a plurality of epicyclic gears 42 and a rim gear 43 formed at the inner wall of the washing tub shaft 20. The decelerator properly reduces revolution per minute (RPM) and transfers the reduced RPM to the upper pulsator shaft 33.

A rotor bushing 110 is installed at the upper portion of the rotational core of the rotor housing 50, and a bracket 120 is installed at the lower portion of the rotor bushing 110. The lower pulsator shaft 31 penetrates the cores of the rotor bushing 110 and the bracket 120. At this time, the lower pulsator shaft 31 penetrates the rotor bushing 110, but they are not coupled with each other. Accordingly, the lower pulsator shaft is only slidingly moved with respect to the rotor bushing 110. Also, the bracket 120 functions as a power transferring member for transferring the rotational force of the rotor housing 50 to the lower pulsator shaft 31. For this purpose, the bracket is coupled to the rotor housing 50 and at the same time is also coupled to the lower pulsator shaft 31. Also, the rotor bushing 110 and the bracket 120 are fixed to the rotor housing 50 by a plurality of coupling members 160. Here, it should be noted that the bracket 120 and the rotor bushing 110 are conventionally made in a single member, but they are made in two separatable members in the present invention. Such a separate structure is to minimize a transfer of the vibration, as will be described later.

Over the rotor bushing 110 is installed a power breaking member 130. The power breaking member 130 is a member for selectively transferring the rotational force of the lower pulsator shaft 31 to the washing tub shaft. For this purpose, the lower pulsator shaft 31 penetrates the core of the power breaking member 130, and the power breaking member 130 and the lower pulsator shaft 31 are coupled to each other. Here, it should be noted that the power breaking member 130 and the lower pulsator shaft 31 are conventionally made in a single member, but they are made in two separatable members in the present invention. Such a separate structure is to minimize a transfer of the vibration, as will be described later.

A coupling 70 is installed at an outer circumference of the washing tub shaft 20. The coupling 70 selectively constrains the washing tub shaft 20 to the power breaking member 130 while ascending and descending along the outer circumference of the power breaking member 130. For this purpose, a serration part 21 is formed at an outer circumference of the washing tub shaft 20, and a serration part is also installed at an inner circumference of the coupling 70. At this time, a protruded part 71 is formed in the coupling 70 and an insertion groove 15 is formed in the bearing housing 10. In other words, when the coupling 70 ascends, the protruded part 71 is inserted into the insertion groove 15 and fixed to.

Meanwhile, in order to prevent the vibration generated from the rotor 5 from being transferred to the washing tub or the outer tub 1, at least one vibration-absorbing member 140, 150 is installed on a path where a power is transferred from the rotor housing 50 to the pulsator shaft 31, 33 or the washing tub shaft 20. At this time, the vibration-absorbing member includes a first vibration-absorbing member 140 installed between the rotor housing 50 and the bracket 120, and a second vibration-absorbing member 150 installed between the rotor bushing 110 and the power breaking member 130. The first vibration-absorbing member 140 absorbs the vibration of the rotor housing 50, thereby preventing the vibration from being transferred to the lower pulsator shaft 31. The vibration-absorbing member 150 absorbs the vibration of the rotor bushing 110 rotating along with the rotor housing 50, thereby preventing the vibration from being transferred to the washing tub shaft 20.

Hereinafter, coupling relations of elements including the lower pulsator shaft 31 and the bracket are concretely described.

As shown in FIG. 4, the lower pulsator shaft 31 is provided with a first coupling part 31a having a polygonal section, approximately hexagon section, and a second coupling part 31b extended from the lower end of the first coupling part 31a and having a screw thread formed at the surface thereof. The first coupling part 31a sequentially penetrates the power breaking member 130, the second vibration-absorbing member 150, the rotor bushing 110 and the bracket 120. The lower pulsator shaft 31 is fixed to the bracket 120 by coupling the second coupling part 31b with a nut 35.

The power breaking member 130 is a ring-shaped member that is the same in outer diameter as the washing tub shaft 20, and has a coupling hole formed at the core thereof. The power breaking member 130 is coupled to the lower pulsator shaft 31 through the coupling hole 131. For this purpose, the coupling hole 131 has a polygonal face corresponding to the first coupling part 31a of the lower pulsator shaft 31. At this time, it may be allowed to form a serration part engaged with the first coupling part 31a of the lower pulsator shaft 31 and the coupling hole 131 of the power breaking member 130, respectively. And, a serration part 133 is formed at the outer circumference of the power breaking member 130. The serration part 133 of the power breaking member 130 is selectively coupled to the serration part formed at the inner circumference of the coupling 70. In other words, the coupling 70 ascends and descends along the serration part 21 of the washing tub shaft 20 and the serration part 133 of the power breaking member 130.

The second vibration-absorbing member 150 is a ring-shaped sheet, and has a penetration hole 151 formed at the core thereof and through which the first coupling part 31a of the lower pulsator shaft 31 penetrates.

The rotor bushing 110 has a penetration hole 111 formed at the core thereof. The first coupling part 31a of the lower pulsator shaft 31 penetrates the penetration hole 111 of the rotor bushing 110. However, the first coupling part 31a is not coupled to the penetration hole 111. Accordingly, the lower pulsator shaft 31 and the rotor bushing 110 perform only a sliding motion, and do not influence the rotation of the counterpart. And, a circular mounting groove 113 is formed at the lower surface of the rotor bushing 110. (refer to FIG. 3)

The bracket 120 has a coupling hole 121 formed at the core thereof. The lower pulsator shaft 31 penetrates the coupling hole 121 to be coupled to the bracket 120. For this purpose, the coupling hole 121 of the bracket 120 has a polygonal face corresponding to the first coupling part 31a of the lower pulsator shaft 31. At this time, it may be allowed to form a serration part engaged with the first coupling part 31a of the lower pulsator shaft 31 and the coupling hole 121 of the bracket 120, respectively. The bracket 120 has a circular protruded mounting part 123 formed at the core thereof. The mounting part 123 is inserted into the mounting groove 113 of the rotor bushing 110. At this time, the mounting part 123 maintains a status that is not in contact with the mounting groove 113.

As aforementioned, the rotor bushing 110 and the bracket 120 are firmly fixed to the rotor housing 50 by the coupling member 160. For this purpose, a plurality of coupling holes 115 are formed at the rotor bushing 110, and a plurality of insertion holes 125 are formed at the bracket 120. The coupling holes 115 and the insertion holes 125 are formed at corresponding locations.

The coupling member 160 includes a body part 161, 163 inserted into the rotor bushing 110 and the bracket 120, and a flange part 165 having a greater diameter than the body part. The body part includes a first coupling part 161 is fixedly inserted into the coupling hole 115, and a second coupling part 163 inserted into the insertion hole 125. At the outer circumference of the first coupling part 161 is formed a screw thread engaged with the coupling hole 115. Accordingly, the first coupling part 161 penetrates the rotor housing 50 to be coupled to the coupling hole 115. The second coupling part 163 fixes the first vibration-absorbing member 140 while penetrating the insertion hole 125. And, the flange part 165 is formed between the first coupling part 161 and the second coupling part 163 to prevent the bracket 120 from being directly contacted with the rotor housing 50.

The first vibration-absorbing member 140 is fixedly inserted into the insertion hole 125 of the bracket 120. The first vibration-absorbing member 140 is a hollow cylindrical shape enclosing the outer circumference of the second coupling part 163, and the second coupling part 163 is inserted into the interior of the first vibration-absorbing member 140, so that the vibration-absorbing member 140 is firmly fixed to the bracket 120. At this time, the first vibration-absorbing member 140 has a head part 141 at the upper end thereof. The head part 141 prevents the flange part 165 from being directly contacted with the bracket 120.

Meanwhile, the first and second vibration-absorbing members 140 and 150 are preferably made of elastic material such as rubber.

In summary, the first vibration-absorbing member 140 is installed between the rotor housing 50 and the bracket 120, to absorb the vibration of the rotor housing 50. Accordingly, it is prevented that the vibration of the rotor housing 50 is transferred to the bracket 120. This means that the vibration of the rotor housing 50 is not transferred to the lower pulsator shaft 31. Also, the second vibration-absorbing member 150 is installed between the rotor bushing 110 and the power breaking member 130, to absorb the vibration of the rotor bushing 110. Accordingly, it is prevented that the vibration of the rotor bushing 110 is transferred to the power breaking member 130. This means that the vibration of the rotor bushing 110 is not transferred to the washing tub shaft 20.

Operation of the washing machine according to the present invention is described as follows.

First, FIG. 3 illustrates a status of a washing cycle. The coupling ascends with the help of an ascent inducing member such as a clutch assembly (not shown). At this time, the coupling 70 ascends along the outer circumference of the washing tub shaft 20 until the protruded part 71 is inserted into the insertion groove 15 of the bearing housing 10. As a result, the washing tub shaft 20 is separated from the power breaking member 130.

In this state, the rotor housing 50 is rotated by an interaction of the rotor 5 and the stator 3. The rotational force of the rotor housing 50 is transferred to the rotor bushing 110 and at the same time is transferred to the bracket 120 via the coupling member 160. Also, the vibration of the rotor bushing 110 is attenuated by the second vibration-absorbing member 150.

After that, the rotational force of the rotor housing 50 is transferred to the lower pulsator shaft 31, the decelerator 40 and the upper 33 in the named order. In this procedure, the RPM of the lower pulsator shaft 31 is properly decelerated through the decelerator 40, and is then transferred to the upper pulsator shaft 33. Accordingly, the upper pulsator shaft 33 rotates the pulsator at a low speed, so that water stream is generated inside the washing tub.

Next, FIG. 5 illustrates a status of the dehydration cycle. Referring to FIG. 5, the coupling descends by the weight of itself or with the help of the clutch assembly. At this time, the coupling 70 descends along the outer circumference of the washing tub shaft 20 and the outer circumference of the power breaking member 130, to constrain the washing tub shaft 20 and the power breaking member 130 at the same time.

In this state, the rotational force of the rotor housing 50 is transferred to the rotor bushing and at the same time is transferred to the bracket 120 via the coupling member 160. During this procedure, the vibration of the rotor housing 50 is attenuated by the first vibration-absorbing member 140. Also, the vibration of the rotor bushing 110 is attenuated by the second vibration-absorbing member 150.

After that, the rotational force of the rotor housing 50 is transferred to the lower pulsator shaft 31, and is continuously transferred to the washing tub shaft 20 via the power breaking member 130 and the coupling 70. Accordingly, the washing tub shaft 20 is rotated along with the lower pulsator shaft 31 and the upper pulsator shaft 33 at the same speed. Accordingly, the washing tub is rotated at a high speed, so that washing water is removed by centrifugal force.

While the aforementioned embodiments show and describe vibration-preventive structure of the driving part of a washing machine having all the pulsator shaft 31, 33 and the washing tub shaft 20, they can be naturally applied to a washing machine in which washing cycle and dehydration cycle are performed by a single driving shaft by controlling the rotational speed of the driving part.

According to a washing machine of the present invention, at least one vibration-absorbing member is provided on a path where a power of the driving part is transferred to the washing tub or outer tub, thereby capable of absorbing the vibration of the driving part. Accordingly, it is prevented that the vibration of the driving part, in particular the vibration due to the ripple phenomenon is transferred to the washing tub or outer tub, so that it becomes possible to reduce a set noise considerably as a whole.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A washing machine part comprising:
   a rotor housing in which a rotor is installed and which is rotatably moved;
   a driving shaft for rotating a washing tub or a pulsator using a rotational force transferred from the rotor housing;
   a power transferring member for transferring the rotational force of the rotor housing to the driving shaft;
   a rotor bushing coupled to the rotor housing and through which the driving shaft penetrates to be slidingly moved, the driving shaft and rotor bushing not being coupled with each other; and
   at least one vibration-absorbing member installed on a path where a power is transferred from the rotor housing to the driving shaft, for absorbing vibration of the rotor housing.

2. The washing machine part of claim 1, wherein the power transferring member is a bracket which is coupled to the rotor housing and through which the driving shaft penetrates.

3. The washing machine part of claim 2, wherein the vibration-absorbing member is installed between the rotor housing and the bracket.

4. The washing machine part of claim 1, further comprising a power breaking member coupled to the driving shaft, for selectively transferring the rotational force of the driving shaft to the washing tub.

5. The washing machine part of claim 4, wherein the vibration-absorbing member is installed between the rotor bushing and the power breaking member.

6. The washing machine part of claim 1, further comprising:
   a coupling member coupling the power transferring member to the rotor housing with a gap to transfer a rotational force of the rotor housing to the power transferring member and to prevent the rotor housing from being in contact with the transferring member.

7. The washing machine part of claim 6, wherein the vibration-absorbing member is installed between the coupling member and the power transferring member to reduce transfer of vibration of the rotor housing to the power transfer member.

8. The washing machine part of claim 1, wherein the driving shaft and rotor bushing are not directly coupled with each other.

9. A washing machine part comprising:
   a rotor housing in which a rotor is installed and which is rotatably moved;
   a hollow washing tub shaft for rotating a washing tub using a transferred rotational force of the rotor housing;
   a pulsator shaft installed inside the hollow washing tub shaft, for rotating a pulsator using the transferred rotational force of the rotor housing;
   a rotor bushing coupled to the rotor housing and through which the pulsator shaft penetrates to be slidingly moved, the driving shaft and rotor bushing not being coupled with each other;
   a bracket which is coupled to the rotor housing and at the same time which the pulsator shaft penetrates and is coupled to, for transferring the rotational force of the rotor housing to the pulsator shaft;

a coupling member for fixing the rotor bushing and the bracket to the rotor housing;

a power breaking member through which the pulsator shaft penetrates to be coupled and which is selectively coupled with the hollow washing tub shaft to transfer the rotational force of the pulsator shaft to the hollow washing tub shaft;

a coupling ascending and descending along an outer circumference of the hollow washing tub shaft and an outer circumference of the power breaking member, for selectively constraining the hollow washing tub shaft and the power breaking member; and at least one vibration-absorbing member installed on a path where a power is transferred to the pulsator shaft or the hollow washing tub shaft, for absorbing vibration of the rotor housing.

10. The washing machine part of claim 9, wherein an outer circumference of the pulsator shaft and an inner circumference of the bracket have polygonal sections to be engaged with each other.

11. The washing machine part of claim 9, wherein the vibration-absorbing member is installed between the rotor housing and the bracket.

12. The washing machine part of claim 11, wherein the coupling member comprises:

a body part of which one end is fixedly inserted into the rotor bushing and the other end fixes the vibration-absorbing member while penetrating the bracket; and a flange part being greater in diameter than the body part, and formed between the one end of the body part and the other end of the body part to prevent the bracket from being in contact with the rotor housing.

13. The washing machine part of claim 12, wherein the vibration-absorbing member is a cylindrical shape enclosing an outer circumference of the body part and is inserted into the bracket.

14. The washing machine part of claim 13, wherein the vibration-absorbing member has a head part for preventing the flange part from being in contact with the bracket.

15. The washing machine part of claim 9, wherein an outer circumference of the pulsator shaft and an inner circumference of the power breaking member have polygonal sections to be engaged with each other.

16. The washing machine part of claim 9, wherein the vibration-absorbing member is installed between the rotor bushing and the power breaking member.

17. The washing machine part of claim 9, wherein the vibration-absorbing member is of a material having elasticity.

18. The washing machine part of claim 9, wherein the coupling member couples the bracket to the rotor housing with a gap to prevent the rotor housing from being in contact with the transferring member.

19. The washing machine part of claim 9, wherein: the driving shaft and rotor bushing are not directly coupled with each other.

20. A washing machine part comprising:

a rotor housing in which a rotor is installed and which is rotatably moved;

a hollow washing tub shaft for rotating a washing tub using a transferred rotational force of the rotor housing;

a pulsator shaft installed inside the hollow washing tub shaft, for rotating a pulsator using the transferred rotational force of the rotor housing;

a rotor bushing coupled to the rotor housing and through which the pulsator shaft penetrates to be slidingly moved;

a bracket which is coupled to the rotor housing and to an outer peripheral portion of the rotor bushing and at the same time which the pulsator shaft penetrates and is coupled to, for transferring the rotational force of the rotor housing to the pulsator shaft;

a coupling member for fixing together an outer peripheral portion of the rotor bushing and the outer peripheral portion of the bracket and the rotor housing;

a power breaking member through which the pulsator shaft penetrates to be coupled and which is selectively coupled with the hollow washing tub shaft to transfer the rotational force of the pulsator shaft to the hollow washing tub shaft;

a coupling ascending and descending along an outer circumference of the hollow washing tub shaft and an outer circumference of the power breaking member, for selectively constraining the hollow washing tub shaft and the power breaking member; and at least one vibration-absorbing member installed on a path where a power is transferred from the rotor housing to the driving shaft, for absorbing vibration of the rotor housing, the at least one vibration-absorbing member being located between the outer peripheral portion of the bracket and the outer peripheral portion of the rotor bushing.

* * * * *